US006992032B2

(12) United States Patent
McDaniel et al.

(10) Patent No.: US 6,992,032 B2
(45) Date of Patent: *Jan. 31, 2006

(54) ORGANOMETAL CATALYST COMPOSITIONS

(75) Inventors: Max P. McDaniel, Bartlesville, OK (US); Kathy S. Collins, Bartlesville, OK (US); James L. Smith, Bartlesville, OK (US); Elizabeth A. Benham, Bartlesville, OK (US); Marvin M. Johnson, Bartlesville, OK (US); Anthony P. Eaton, Dewey, OK (US); Michael D. Jensen, Bartlesville, OK (US); Joel L. Martin, Bartlesville, OK (US); Gil R. Hawley, Dewey, OK (US)

(73) Assignee: Phillips Petroleum Company, Bartlesville, OK (US)

( * ) Notice: Subject to any disclaimer, the term of this patent is extended or adjusted under 35 U.S.C. 154(b) by 150 days.

This patent is subject to a terminal disclaimer.

(21) Appl. No.: 10/441,153

(22) Filed: May 19, 2003

(65) Prior Publication Data

US 2004/0024147 A1    Feb. 5, 2004

Related U.S. Application Data

(62) Division of application No. 10/085,931, filed on Feb. 28, 2002, now Pat. No. 6,653,416, which is a division of application No. 09/408,904, filed on Sep. 29, 1999, now Pat. No. 6,395,666.

(51) Int. Cl.
    *B01J 29/04* (2006.01)
(52) U.S. Cl. ............... 502/87; 502/103; 502/104; 502/152; 526/160; 526/943
(58) Field of Classification Search ............... 502/103, 502/87, 104, 152; 526/160, 943
    See application file for complete search history.

(56) References Cited

U.S. PATENT DOCUMENTS 4,752,597 A    6/1988    Turner

| | | |
|---|---|---|
| 5,171,798 A | 12/1992 | McDaniel et al. |
| 5,434,116 A | 7/1995 | Sone et al. |
| 5,527,867 A | 6/1996 | Bergmeister |
| 5,565,397 A | 10/1996 | Sangokoya |
| 5,565,534 A | 10/1996 | Aulbach et al. |
| 5,648,439 A | 7/1997 | Bergmeister et al. |
| 5,703,181 A | 12/1997 | Tashiro et al. |
| 5,705,578 A | 1/1998 | Peifer et al. |
| 5,719,241 A | 2/1998 | Razavi et al. |
| 5,885,924 A | 3/1999 | Ward |
| 5,910,464 A | 6/1999 | Resconi et al. |
| 6,239,059 B1 | 5/2001 | Saudemont et al. |
| 6,300,271 B1 | 10/2001 | McDaniel et al. |

FOREIGN PATENT DOCUMENTS

| | | | |
|---|---|---|---|
| EP | 0416928 A2 | | 3/1991 |
| EP | 0 628 574 | * | 12/1994 |
| EP | 0628574 A1 | | 12/1994 |
| EP | 0949273 A1 | | 10/1999 |
| HU | P8700414 | | 9/1988 |
| HU | 217030 | | 12/1994 |
| HU | 220239 | | 5/1995 |
| HU | 220638 | | 11/1995 |
| WO | WO 98/31463 | * | 7/1998 |
| WO | WO 99/66033 | | 11/1999 |

OTHER PUBLICATIONS

Search Report from Hungarian Patent Application No. P0202746.

* cited by examiner

*Primary Examiner*—Ling-Sui Choi
(74) *Attorney, Agent, or Firm*—Womble Carlyle Sandridge & Rice, PLLC

(57) ABSTRACT

This invention provides catalyst compositions that are useful for polymerizing at least one monomer to produce a polymer. This invention also provides catalyst compositions that are useful for polymerizing at least one monomer to produce a polymer, wherein said catalyst composition comprises a post-contacted organometal compound, a post-contacted organoaluminum compound, and a post-contacted fluorided solid oxide compound.

14 Claims, No Drawings

ORGANOMETAL CATALYST COMPOSITIONS

CROSS-REFERENCE TO RELATED APPLICATION

This application is a divisional application of co-pending U.S. patent application Ser. No. 10/085,931 filed Feb. 28, 2002, now U.S. Pat. No. 6,653,416 B2 which is a divisional application of U.S. patent application Ser. No. 09/408,904 filed Sep. 29, 1999, now U.S. Pat. No. 6,395,666 B1, both of which are incorporated herein in their entirety by reference.

FIELD OF THE INVENTION

This invention is related to the field of organometal catalyst compositions.

BACKGROUND OF THE INVENTION

The production of polymers is a multi-billion dollar business. This business produces billions of pounds of polymers each year. Millions of dollars have been spent on developing technologies that can add value to this business.

One of these technologies is called metallocene catalyst technology. Metallocene catalysts have been known since about 1960. However, their low productivity did not allow them to be commercialized. About 1975, it was discovered that contacting one part water with two parts trimethylaluminum to form methyl aluminoxane, and then contacting such methyl aluminoxane with a metallocene compound, formed a metallocene catalyst that had greater activity. However, it was soon realized that large amounts of expensive methyl aluminoxane were needed to form an active metallocene catalyst. This has been a significant impediment to the commercialization of metallocene catalysts.

Borate compounds have been use in place of large amounts of methyl aluminoxane. However, this is not satisfactory, since borate compounds are very sensitive to poisons and decomposition, and can also be very expensive.

It should also be noted that having a heterogeneous catalyst is important. This is because heterogeneous catalysts are required for most modern commercial polymerization processes. Furthermore, heterogeneous catalysts can lead to the formation of substantially uniform polymer particles that have a high bulk density. These types of substantially uniformed particles are desirable because they improve the efficiency of polymer production and transportation. Efforts have been made to produce heterogeneous metallocene catalysts; however, these catalysts have not been entirely satisfactory.

Therefore, there is a need in the polymer industry to provide an economic material to activate metallocene catalysts, and there is also a need for efficient heterogeneous metallocene catalysts. The inventors provide this invention to help solve these problems.

SUMMARY OF THE INVENTION

An object of this invention is to provide a process that produces a catalyst composition that can be used to polymerize at least one monomer to produce a polymer.

Another object of this invention is to provide the catalyst composition.

Another object of this invention is to provide a process comprising contacting at least one monomer and the catalyst composition under polymerization conditions to produce the polymer.

Another object of this invention is to provide an article that comprises the polymer produced with the catalyst composition of this invention.

In accordance with one embodiment of this invention, a process to produce a catalyst composition is provided. The process comprises (or optionally, "consists essentially of", or "consists of") contacting an organometal compound, an organoaluminum compound, and a fluorided solid oxide compound;

wherein said organometal compound has the following general formula:

$$(X^1)(X^2)(X^3)(X^4)M^1$$

wherein $M^1$ is selected from the group consisting of titanium, zirconium, and hafnium;

wherein $(X^1)$ is independently selected from the group consisting of cyclopentadienyls, indenyls, fluorenyls, substituted cyclopentadienyls, substituted indenyls, and substituted fluorenyls;

wherein substituents on the substituted cyclopentadienyls, substituted indenyls, and substituted fluorenyls of $(X^1)$ are selected from the group consisting of aliphatic groups, cyclic groups, combinations of aliphatic and cyclic groups, silyl groups, alkyl halide groups, halides, organometallic groups, phosphorus groups, nitrogen groups, silicon, phosphorus, boron, germanium, and hydrogen;

wherein at least one substituent on $(X^1)$ can be a bridging group which connects $(X^1)$ and $(X^2)$;

wherein $(X^3)$ and $(X^4)$ are independently selected from the group consisting of halides, aliphatic groups, substituted aliphatic groups, cyclic groups, substituted cyclic groups, combinations of aliphatic groups and cyclic groups, combinations of substituted aliphatic groups and cyclic groups, combinations of aliphatic groups and substituted cyclic groups, combinations of substituted aliphatic groups and substituted cyclic groups, amido groups, substituted amido groups, phosphido groups, substituted phosphido groups, alkyloxide groups, substituted alkyloxide groups, aryloxide groups, substituted aryloxide groups, organometallic groups, and substituted organometallic groups;

wherein $(X^2)$ is selected from the group consisting of cyclopentadienyls, indenyls, fluorenyls, substituted cyclopentadienyls, substituted indenyls, substituted fluorenyls, halides, aliphatic groups, substituted aliphatic groups, cyclic groups, substituted cyclic groups, combinations of aliphatic groups and cyclic groups, combinations of substituted aliphatic groups and cyclic groups, combinations of aliphatic groups and substituted cyclic groups, combinations of substituted aliphatic groups and substituted cyclic groups, amido groups, substituted amido groups, phosphido groups, substituted phosphido groups, alkyloxide groups, substituted alkyloxide groups, aryloxide groups, substituted aryloxide groups, organometallic groups, and substituted organometallic groups;

wherein substituents on $(X^2)$ are selected from the group consisting of aliphatic groups, cyclic groups, combinations of aliphatic groups and cyclic groups, silyl groups, alkyl halide groups, halides, organometallic groups, phosphorus groups, nitrogen groups, silicon, phosphorus, boron, germanium, and hydrogen;

wherein at least one substituent on $(X^2)$ can be a bridging group which connects $(X^1)$ and $(X^2)$;

wherein the organoaluminum compound has the following general formula:

$$Al(X^5)_n(X^6)_{3-n}$$

wherein $(X^5)$ is a hydrocarbyl having from 1 to about 20 carbon atoms;

wherein $(X^6)$ is a halide, hydride, or alkoxide; and wherein "n" is a number from 1 to 3 inclusive;

wherein the fluorided solid oxide compound comprises fluoride and a solid oxide compound;

wherein the solid oxide compound is selected from the group consisting of silica-titania and silica zirconia.

In accordance with another embodiment of this invention, a process is provided comprising contacting at least one monomer and the catalyst composition under polymerization conditions to produce a polymer.

In accordance with another embodiment of this invention, an article is provided. The article comprises the polymer produced in accordance with this invention.

These objects, and other objects, will become more apparent to those with ordinary skill in the art after reading this disclosure.

DETAILED DESCRIPTION OF THE INVENTION

Organometal compounds used in this invention have the following general formula:

$$(X^1)(X^2)(X^3)(X^4)M^1$$

In this formula, $M^1$ is selected from the group consisting of titanium, zirconium, and hafnium. Currently, it is most preferred when $M^1$ is zirconium.

In this formula, $(X^1)$ is independently selected from the group consisting of (hereafter "Group OMC-I") cyclopentadienyls, indenyls, fluorenyls, substituted cyclopentadienyls, substituted indenyls, such as, for example, tetrahydroindenyls, and substituted fluorenyls, such as, for example, octahydrofluorenyls.

Substituents on the substituted cyclopentadienyls, substituted indenyls, and substituted fluorenyls of $(X^1)$ can be selected independently from the group consisting of aliphatic groups, cyclic groups, combinations of aliphatic and cyclic groups, silyl groups, alkyl halide groups, halides, organometallic groups, phosphorus groups, nitrogen groups, silicon, phosphorus, boron, germanium, and hydrogen, as long as these groups do not substantially, and adversely, affect the polymerization activity of the catalyst composition.

Suitable examples of aliphatic groups are hydrocarbyls, such as, for example, paraffins and olefins. Suitable examples of cyclic groups are cycloparaffins, cycloolefins, cycloacetylenes, and arenes. Substituted silyl groups include, but are not limited to, alkylsilyl groups where each alkyl group contains from 1 to about 12 carbon atoms, arylsilyl groups, and arylalkylsilyl groups. Suitable alkyl halide groups have alkyl groups with 1 to about 12 carbon atoms. Suitable organometallic groups include, but are not limited to, substituted silyl derivatives, substituted tin groups, substituted germanium groups, and substituted boron groups.

Suitable examples of such substituents are methyl, ethyl, propyl, butyl, tert-butyl, isobutyl, amyl, isoamyl, hexyl, cyclohexyl, heptyl, octyl, nonyl, decyl, dodecyl, 2-ethylhexyl, pentenyl, butenyl, phenyl, chloro, bromo, iodo, trimethylsilyl, and phenyloctylsilyl.

In this formula, $(X^3)$ and $(X^4)$ are independently selected from the group consisting of (hereafter "Group OMC-II") halides, aliphatic groups, substituted aliphatic groups, cyclic groups, substituted cyclic groups, combinations of aliphatic groups and cyclic groups, combinations of substituted aliphatic groups and cyclic groups, combinations of aliphatic groups and substituted cyclic groups, combinations of substituted aliphatic and substituted cyclic groups, amido groups, substituted amido groups, phosphido groups, substituted phosphido groups, alkyloxide groups, substituted alkyloxide groups, aryloxide groups, substituted aryloxide groups, organometallic groups, and substituted organometallic groups, as long as these groups do not substantially, and adversely, affect the polymerization activity of the catalyst composition.

Suitable examples of aliphatic groups are hydrocarbyls, such as, for example, paraffins and olefins. Suitable examples of cyclic groups are cycloparaffins, cycloolefins, cycloacetylenes, and arenes. Currently, it is preferred when $(X^3)$ and $(X^4)$ are selected from the group consisting of halides and hydrocarbyls, where such hydrocarbyls have from 1 to about 10 carbon atoms. However, it is most preferred when $(X^3)$ and $(X^4)$ are selected from the group consisting of fluoro, chloro, and methyl.

In this formula, $(X^2)$ can be selected from either Group OMC-I or Group OMC-II.

At least one substituent on $(X^1)$ or $(X^2)$ can be a bridging group that connects $(X^1)$ and $(X^2)$, as long as the bridging group does not substantially, and adversely, affect the activity of the catalyst composition. Suitable bridging groups include, but are not limited to, aliphatic groups, cyclic groups, combinations of aliphatic groups and cyclic groups, phosphorous groups, nitrogen groups, organometallic groups, silicon, phosphorus, boron, and germanium.

Suitable examples of aliphatic groups are hydrocarbyls, such as, for example, paraffins and olefins. Suitable examples of cyclic groups are cycloparaffins, cycloolefins, cycloacetylenes, and arenes. Suitable organometallic groups include, but are not limited to, substituted silyl derivatives, substituted tin groups, substituted germanium groups, and substituted boron groups.

Various processes are known to make these organometal compounds. See, for example, U.S. Pat. Nos. 4,939,217; 5,210,352; 5,436,305; 5,401,817; 5,631,335; 5,571,880; 5,191,132; 5,480,848; 5,399,636; 5,565,592; 5,347,026; 5,594,078; 5,498,581; 5,496,781; 5,563,284; 5,554,795; 5,420,320; 5,451,649; 5,541,272; 5,705,478; 5,631,203; 5,654,454; 5,705,579; and 5,668,230; the entire disclosures of which are hereby incorporated by reference.

Specific examples of such organometal compounds are as follows:

bis(cyclopentadienyl)hafnium dichloride;

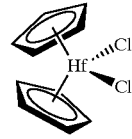

bis(cyclopentadienyl)zirconium dichloride;

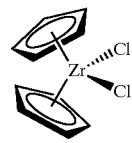

1,2-ethanediylbis($\eta^5$-1-indenyl)di-n-butoxyhafnium;

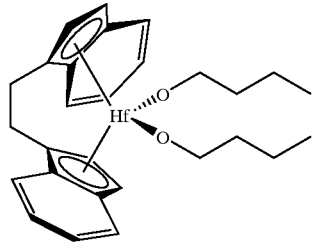

1,2-ethanediylbis($\eta^5$-1-indenyl)dimethylzirconium;

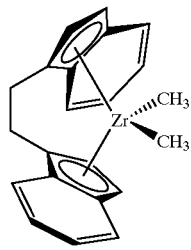

3,3-pentanediylbis($\eta^5$-4,5,6,7-tetrahydro-1-indenyl) hafnium dichloride;

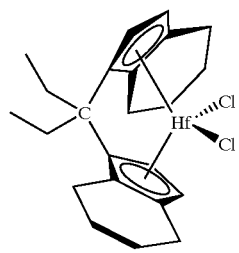

methylphenylsilylbis($\eta^5$-4,5,6,7-tetrahydro-1-indenyl) zirconium dichloride;

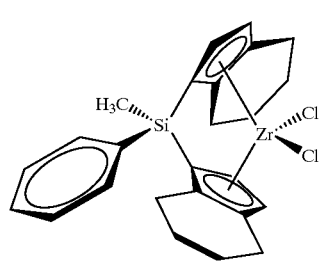

bis(n-butylcyclopentadienyl)bis(di-t-butylamido) hafnium;

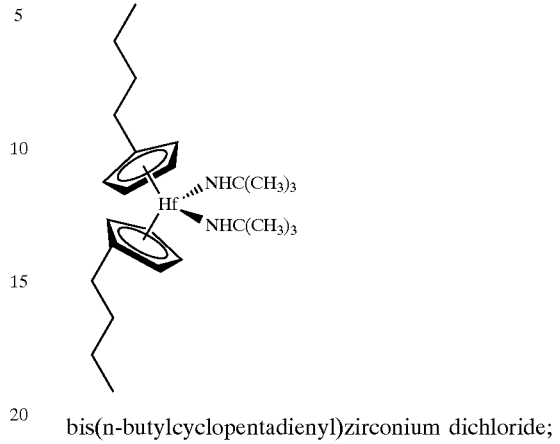

bis(n-butylcyclopentadienyl)zirconium dichloride;

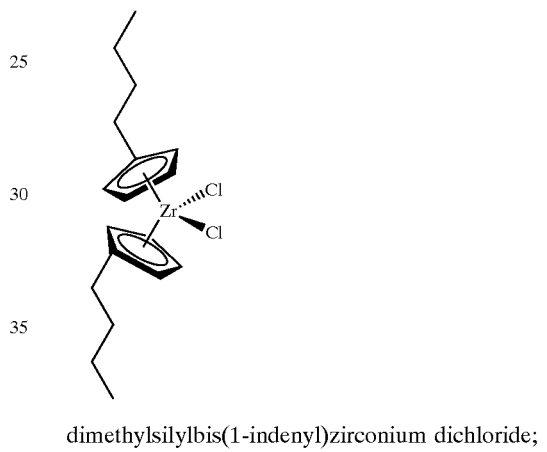

dimethylsilylbis(1-indenyl)zirconium dichloride;

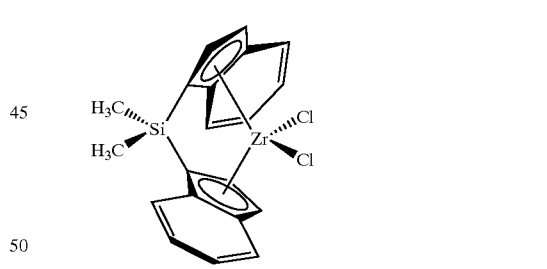

octylphenylsilylbis(1-indenyl)hafnium dichloride;

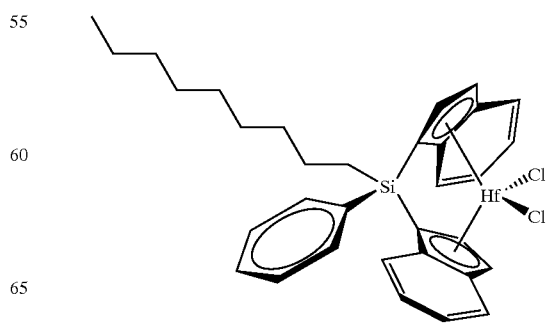

dimethylsilylbis($\eta^5$-4,5,6,7-tetrahydro-1-indenyl)zirconium dichloride;

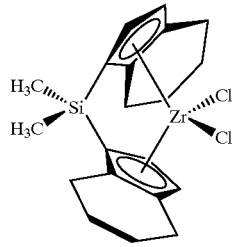

dimethylsilylbis(2-methyl-1-indenyl)zirconium dichloride;

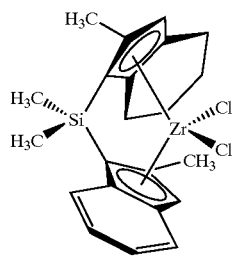

1,2-ethanediylbis(9-fluorenyl)zirconium dichloride;

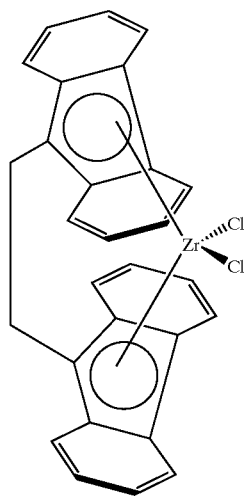

indenyl diethoxy titanium(IV) chloride;

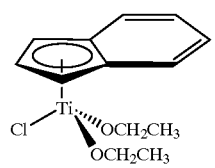

(isopropylamidodimethylsilyl)cyclopentadienyltitanium dichloride;

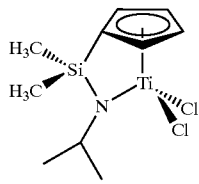

bis(pentamethylcyclopentadienyl)zirconium dichloride;

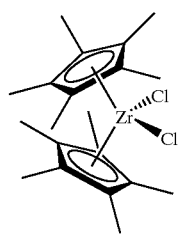

bis(indenyl)zirconium dichloride;

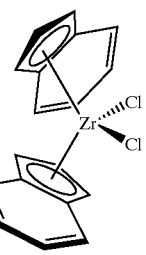

methyloctylsilyl bis(9-fluorenyl)zirconium dichloride;

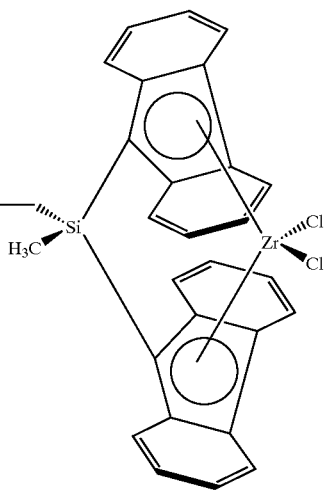

and bis-[1-(N,N-diisopropylamino)boratabenzene]hydridozirconium trifluoromethylsulfonate

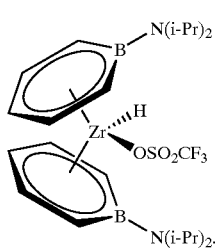

Preferably, said organometal compound is selected from the group consisting of bis(n-butylcyclopentadienyl)zirconium dichloride;

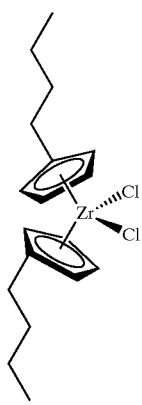

bis(indenyl)zirconium dichloride;

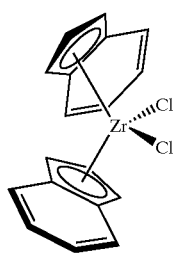

dimethylsilylbis(1-indenyl)zirconium dichloride;

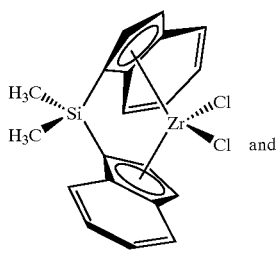 and methyloctylsilylbis(9-fluorenyl)zirconium dichloride

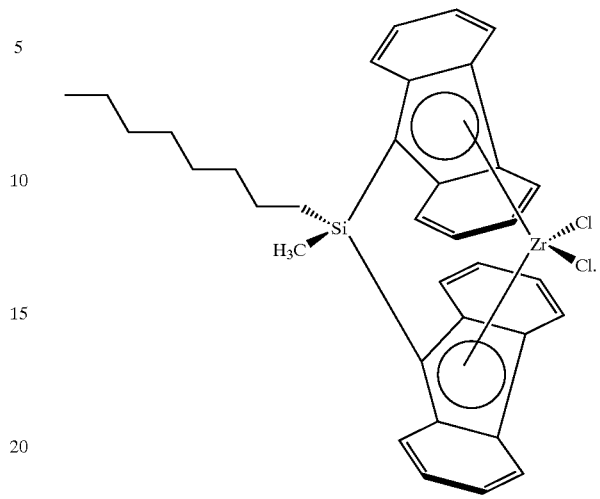

Organoaluminum compounds have the following general formula:

$$Al(X^5)_n(X^6)_{3-n}$$

In this formula, ($X^5$) is a hydrocarbyl having from 1 to about 20 carbon atoms. Currently, it is preferred when ($X^5$) is an alkyl having from 1 to 10 carbon atoms. However, it is most preferred when ($X^5$) is selected from the group consisting of methyl, ethyl, propyl, butyl, and isobutyl.

In this formula, ($X^6$) is a halide, hydride, or alkoxide. Currently, it is preferred when ($X^6$) is independently selected from the group consisting of fluoro and chloro. However, it is most preferred when ($X^6$) is chloro.

In this formula, "n" is a number from 1 to 3 inclusive. However, it is preferred when "n" is 3.

Examples of such compounds are as follows:
trimethylaluminum;
triethylaluminum (TEA);
tripropylaluminum;
diethylaluminum ethoxide;
tributylaluminum;
triisobutylaluminum hydride;
triisobutylaluminum;
diisobutylaluminum hydride; and
diethylaluminum chloride.

Currently, TEA is preferred.

The fluorided solid oxide compound comprises fluoride and a solid oxide compound. The solid oxide compound is selected from the group consisting of silica-titania and silica-zirconia. Silica is the majority component of the solid oxide compound.

The titania content of the silica-titania generally ranges from about 0.5% to about 30% by weight titanium, preferably, from about 2.5% to about 15% by weight titanium, and most preferably, from 4 to 10% by weight titanium.

The zirconia content of the silica-zirconia generally ranges from about 1% to about 40% by weight zirconium, preferably, from about 5% to about 30% by weight zirconium, and most preferably, from 8 to 20% by weight zirconium.

The solid oxide compound should have a pore volume greater than about 0.5 cc/g, preferably greater than about 0.8 cc/g, and most preferably, greater than 1 cc/g.

The solid oxide compound should have a surface area from about 100 m$^2$/g to about 1000 m$^2$/g, preferably from about 200 m$^2$/g to about 800 m$^2$/g, and most preferably, from 200 m$^2$/g to 800 m$^2$/g.

The solid oxide compound can be made by any method known in the art. In a first method, the solid oxide compound can be made by cogellation of aqueous materials, as represented in U.S. Pat. Nos. 3,887,494; 3,119,569; 4,405,501; 4,436,882; 4,436,883; 4,392,990; 4,081,407; 4,981,831; and 4,152,503; the entire disclosures of which are hereby incorporated by reference. In this procedure, a titanium or zirconium salt, such as titanyl sulfate, is dissolved in an acid, such as sulfuric acid, to which sodium silicate is added until gellation occurs at neutral pH. Aging for several hours at about pH 7 to 10 and at about 60 to about 90° C. is followed by washing and drying. Drying may be accomplished by any means known in the art, such as, for example, azeotropic distillation, spray drying, flash drying, vacuum drying, and the like.

In a second method, the solid oxide compound can be made by cogellation in an organic or anhydrous solution as represented by U.S. Pat. Nos. 4,301,034; 4,547,557; and 4,339,559; the entire disclosures of which are hereby incorporated by reference. By these techniques, an organic silicate, such as, for example, tetraethyl orthosilicate, and an organic titanate or organic zirconate, such as, for example, titanium or zirconium tetraisopropoxide, is dissolved in an organic solution, such as, for example, an alcohol, to which a small amount of water is added along with an acid or base to cause hydrolysis and gellation of the solid oxide compound. The order of introduction of these ingredients can be varied, and the addition of each can be divided into stages to achieve special properties. Aging and drying often result in a high porosity solid oxide compound.

In a third method, the solid oxide compound can be made by coating the surface of silica with a layer of titania or zirconia, as exemplified by U.S. Pat. Nos. 4,424,320; 4,405,768; 4,402,864; 4,382,022; 4,368,303; and 4,294,724; the entire disclosures of which are hereby incorporated by reference. Any technique known in the art can be used. One particularly common method is to treat a silica, which has been dried at about 200° C. to remove adsorbed water, with an organic solution of a titanium or zirconium alkoxide, such as, for example, titanium isopropoxide, or a titanium or zirconium halide, such as, for example, titanium tetrachloride. Subsequent drying and calcining in air at high temperature converts the titanium or zirconium into titania or zirconia, which remains substantially dispersed. This reaction can also be accomplished in a gas phase if the titanium or zirconium compound is vaporized into a gas stream which is then allowed to contact the silica.

Any method known in the art for fluoriding the solid oxide compound with a fluoride-containing compound can be used in this invention. One common way is to impregnate the solid oxide compound with an aqueous solution of a fluoride-containing salt, such as, for example, ammonium fluoride (NH$_4$F), ammonium bifluoride (HHF$_2$), hydrofluoric acid (HF), ammonium silicofluoride ((NH$_4$)$_2$SiF$_6$), ammonium fluoroborate (NH$_4$BF$_4$), ammonium fluorophosphate (NH$_4$PF$_6$), fluoroboric acid (HBF$_4$), and mixtures thereof. Alternatively, the fluoride-containing compound can be dissolved into an organic solvent, such as an alcohol, and used to impregnate the solid oxide compound to minimize shrinkage of pores during drying. Drying can be accomplished by any method known in the art such as vacuum drying, spray drying, flash drying, and the like.

The fluoride-containing compound can also be incorporated into a gel by adding it to one of the aqueous materials before gellation. These aqueous materials were disclosed in the first and second methods for preparing solid oxide compounds discussed previously in this disclosure.

The fluoride-containing compound can also be added to a slurry containing a gel before drying. Formation of a gel was disclosed in the first and second methods for preparing solid oxide compounds discussed previously in this disclosure.

The fluoride-containing compound can also be added during calcining. In this technique, the fluoride-containing compound is vaporized into a gas stream used to fluidize the solid oxide compound so that it is fluorided from the gas stream. In addition to some of the fluoride-containing compounds described above, volatile organic fluorides may be used at temperatures above their decomposition points, or at temperatures high enough to cause reaction. For example, perfluorohexane, perfluorobenzene, trifluoroacetic acid, trifluoroacetic anhydride, hexafluoroacetylacetonate, and the like may be vaporized and contacted with the solid oxide compound at about 300 to about 600° C. in air or nitrogen. Inorganic fluoride containing vapors may also be used, such as, for example, hydrogen fluoride or even elemental fluorine gas.

The solid oxide compound can also be calcined at a temperature in a range of about 100 to about 900° C. before being fluorided.

The amount of fluoride present before calcining is about 2 to about 50% by weight fluoride based on the weight of the fluorided solid oxide compound before calcining. Preferably, it is about 3 to about 25% by weight, and most preferably, it is 4 to 20% by weight fluoride based on the weight of the fluorided solid oxide compound before calcining.

It is important that the fluorided solid oxide compound be calcined. Generally, this calcining is conducted at a temperature in the range of about 200° C. to about 900° C., and for a time in the range of about 1 minute to about 100 hours. Preferably, the fluorided solid oxide compound is calcined at temperatures from about 300° C. to about 700° C. and a time in the range of about 1 hour to about 50 hours, most preferably, temperatures from 350° C. to 600° C. and a time in the range of 3 to 20 hours.

Calcining can be completed in any suitable atmosphere. Generally, the calcining is completed in an inert atmosphere. Alternatively, the calcining can be completed in an oxidizing atmosphere, such as, oxygen or air, or a reducing atmosphere, such as, hydrogen or carbon monoxide. Calcining can also be conducted in stages, for example, conducting the fluoriding in a gas phase at a lower temperature, then further calcining at a higher temperature. Alternatively, calcining can be conducted first in an oxidizing atmosphere, then in a reducing atmosphere at a different temperature, or vice-versa.

Optionally, a small amount of chloride can be included in or after the calcining treatment to achieve higher activity in some cases, or to increase the contribution of the titanium or zirconium.

The catalyst compositions of this invention can be produced by contacting the organometal compound, the organoaluminum compound, and the fluorided solid oxide compound, together. This contacting can occur in a variety of ways, such as, for example, blending. Furthermore, each of these compounds can be fed into a reactor separately, or various combinations of these compounds can be contacted together before being further contacted in the reactor, or all three compounds can be contacted together before being introduced into the reactor.

Currently, one method is to first contact the organometal compound and the fluorided solid oxide compound together, for about 1 minute to about 24 hours, preferably, 1 minute to 1 hour, at a temperature from about 10° C. to about 200° C., preferably 15° C. to 80° C., to form a first mixture, and then contact this first mixture with an organoaluminum compound to form the catalyst composition.

Another method is to precontact the organometal compound, the organoaluminum compound, and the fluorided solid oxide compound before injection into a polymerization reactor for about 1 minute to about 24 hours, preferably, 1 minute to 1 hour, at a temperature from about 10° C. to about 200° C., preferably 20° C. to 80° C.

A weight ratio of organoaluminum compound to the fluorided solid oxide compound in the catalyst composition ranges from about 5:1 to about 1:1000, preferably, from about 3:1 to about 1:100, and most preferably, from 1:1 to 1:50.

A weight ratio of the fluorided solid oxide compound to the organometal compound in the catalyst composition ranges from about 10,000:1 to about 1:1, preferably, from about 1000:1 to about 10:1, and most preferably, from 250:1 to 20:1. The ratios are based on the amount of the components combined to give the catalyst composition.

After contacting, the catalyst composition comprises a post-contacted organometal compound, a post-contacted organoaluminum compound, and a post-contacted fluorided solid oxide compound. It should be noted that the post-contacted fluorided solid oxide compound is the majority, by weight, of the catalyst composition. Often times, specific components of a catalyst are not known, therefore, for this invention, the catalyst composition is described as comprising post-contacted compounds.

A weight ratio of the post-contacted organoaluminum compound to the post-contacted fluorided solid oxide compound in the catalyst composition ranges from about 5:1 to about 1:1000, preferably, from about 3:1 to about 1:100, and most preferably, from 1:1 to 1:50.

A weight ratio of the post-contacted fluorided solid oxide compound to the post-contacted organometal compound in the catalyst composition ranges from about 10,000:1 to about 1:1, preferably, from about 1000:1 to about 10:1, and most preferably, from 250:1 to 20:1

The catalyst composition of this invention has an activity greater than a catalyst composition that uses the same organometal compound, and the same organoaluminum compound, but uses silica or titania that has been impregnated with fluoride as shown in comparative examples 4 and 5. This activity is measured under slurry polymerization conditions, using isobutane as the diluent, and with a polymerization temperature of about 50 to about 150° C., and an ethylene pressure of about 400 to about 800 psig. The reactor should have substantially no indication of any wall scale, coating or other forms of fouling.

However, it is preferred if the activity is greater than about 1000 grams of polymer per gram of fluorided solid oxide compound per hour, more preferably greater than 2000, and most preferably greater than 2,500. This activity is measured under slurry polymerization conditions, using isobutane as a diluent, and with a polymerization temperature of 90° C., and an ethylene pressure of 550 psig. The reactor should have substantially no indication of any wall scale, coating or other forms of fouling.

One of the important aspects of this invention is that no aluminoxane needs to be used in order to form the catalyst composition. Aluminoxane is an expensive compound that greatly increases polymer production costs. This also means that no water is needed to help form such aluminoxanes. This is beneficial because water can sometimes kill a polymerization process. Additionally, it should be noted that no borate compounds need to be used in order to form the catalyst composition. In summary, this means that the catalyst composition, which is heterogenous, and which can be used for polymerizing monomers or monomers and one or more comonomers, can be easily and inexpensively produced because of the absence of any aluminoxane compounds or borate compounds. Additionally, no organochromium compound needs to be added, nor any $MgCl_2$ needs to be added to form the invention. Although aluminoxane, borate compounds, organochromium compounds, or $MgCl_2$ are not needed in the preferred embodiments, these compounds can be used in other embodiments of this invention.

In another embodiment of this invention, a process comprising contacting at least one monomer and the catalyst composition to produce at least one polymer is provided. The term "polymer" as used in this disclosure includes homopolymers and copolymers. The catalyst composition can be used to polymerize at least one monomer to produce a homopolymer or a copolymer. Usually, homopolymers are comprised of monomer residues, having 2 to about 20 carbon atoms per molecule, preferably 2 to about 10 carbon atoms per molecule. Currently, it is preferred when at least one monomer is selected from the group consisting of ethylene, propylene, 1-butene, 3-methyl-1-butene, 1-pentene, 3-methyl-1-pentene, 4-methyl-1-pentene, 1-hexene, 3-ethyl-1-hexene, 1-heptene, 1-octene, 1-nonene, 1-decene, and mixtures thereof.

When a homopolymer is desired, it is most preferred to polymerize ethylene or propylene. When a copolymer is desired, the copolymer comprises monomer residues and one or more comonomer residues, each having from about 2 to about 20 carbon atoms per molecule. Suitable comonomers include, but are not limited to, aliphatic 1-olefins having from 3 to 20 carbon atoms per molecule, such as, for example, propylene, 1-butene, 1-pentene, 4-methyl-1-pentene, 1-hexene, 1-octene, and other olefins and conjugated or nonconjugated diolefins such as 1,3-butadiene, isoprene, piperylene, 2,3-dimethyl-1,3-butadiene, 1,4-pentadiene, 1,7-hexadiene, and other such diolefins and mixtures thereof. When a copolymer is desired, it is preferred to polymerize ethylene and at least one comonomer selected from the group consisting of 1-butene, 1-pentene, 1-hexene, 1-octene, and 1-decene. The amount of comonomer introduced into a reactor zone to produce a copolymer is generally from about 0.01 to about 10 weight percent comonomer based on the total weight of the monomer and comonomer, preferably, about 0.01 to about 5, and most preferably, 0.1 to 4. Alternatively, an amount sufficient to give the above described concentrations, by weight, in the copolymer produced can be used.

Processes that can polymerize at least one monomer to produce a polymer are known in the art, such as, for example, slurry polymerization, gas phase polymerization, and solution polymerization. It is preferred to perform a slurry polymerization in a loop reaction zone. Suitable diluents used in slurry polymerization are well known in the art and include hydrocarbons which are liquid under reaction conditions. The term "diluent" as used in this disclosure does not necessarily mean an inert material; it is possible that a diluent can contribute to polymerization. Suitable hydrocarbons include, but are not limited to, cyclohexane, isobutane, n-butane, propane, n-pentane, isopentane, neopentane, and n-hexane. Furthermore, it is most preferred to use isobutane as the diluent in a slurry polymerization. Examples of such technology can be found in U.S. Pat. Nos. 4,424,341; 4,501,885; 4,613,484; 4,737,280; and 5,597,892; the entire disclosures of which are hereby incorporated by reference.

The catalyst compositions used in this process produce good quality polymer particles without substantially fouling the reactor. When the catalyst composition is to be used in a loop reactor zone under slurry polymerization conditions, it is preferred when the particle size of the solid oxide compound is in the range of about 10 to about 1000 microns, preferably about 25 to about 500 microns, and most preferably, 50 to 200 microns, for best control during polymerization.

In a specific embodiment of this invention, a process is provided to produce a catalyst composition, the process comprising (optionally, "consisting essentially of", or "consisting of"):
  (1) contacting a solid oxide compound with water containing ammonium bifluoride to produce a fluorided solid oxide compound;
    wherein the solid oxide compound is selected from the group consisting of silica-titania and silica-zirconia;
  (2) calcining the fluorided solid oxide compound at a temperature within a range of 350 to 600° C. to produce a calcined composition having 4 to 20 weight percent fluoride based on the weight of the fluorided solid oxide compound before calcining;
  (3) combining the calcined composition and bis(n-butylcyclopentadienyl)zirconium dichloride at a temperature within the range of 15° C. to 80° C. to produce a mixture; and
  (4) after between 1 minute and 1 hour, combining the mixture and triethylaluminum to produce the catalyst composition.

Hydrogen can be used in this invention in a polymerization process to control polymer molecular weight.

One of the features of this invention is that the fluorided solid oxide compound activates the organometal compound much more efficiently than silica, silica-titania, or silica-zirconia alone. Thus, the titania or zirconia contributes to the activation of the organometal compound. A second feature of this invention is that the titania or zirconia is a weak polymerization catalyst in its own right, providing a high molecular weight component onto an otherwise symmetrical molecular weight distribution of the polymer produced by the organometal compound. This high molecular weight component, or skewed molecular weight distribution, imparts higher melt strength and shear response to the polymer than could be obtained from typical organometal compounds. These polymers may vary in molecular weight distribution depending on the organometal compound used and the relative contribution of the titanium or zirconium. One special feature of this invention, therefore, is that polydispersities of about 2.5 to about 4.0 and HLMI/MI values from about 25 to about 50 can be produced from organometal compounds that would otherwise give polydispersities of about 2.1 to about 2.5 and HLMI/MI values less than about 20.

After the polymers are produced, they can be formed into various articles, such as, for example, household containers and utensils, film products, fuel tanks, pipes, geomembranes, and liners. Various processes can form these articles. Usually, additives and modifiers are added to the polymer in order to provide desired effects. It is believed that by using the invention described herein, articles can be produced at a lower cost, while maintaining most, if not all, of the unique properties of polymers produced with organometal compounds.

EXAMPLES

Test Methods

A "Quantachrome Autosorb-6 Nitrogen Pore Size Distribution Instrument" was used to determined the surface area and pore volume of the supports. This instrument was acquired from the Quantachrome Corporation, Syosset, N.Y.

Polymer density was determined in grams per cubic centimeter (g/cc) on a compression molded sample, cooled at about 15° C. per hour, and conditioned for about 40 hours at room temperature in accordance with ASTM D1505 and ASTM D1928, Procedure C.

High load melt index (HLMI, g/10 mins) was determined in accordance with ASTM D1238 at 190° C. with a 21,600 gram weight.

Melt index (MI, g/10 mins) was determined in accordance with ASTM D1238 at 190° C. with a 2,160 gram weight.

Description of Polymerizations Runs:

Polymerization runs were made in a 2.2 liter steel reactor equipped with a marine stirrer running at 400 revolutions per minute (rpm). The reactor was surrounded by a steel jacket containing boiling methanol with a connection to a steel condenser. The boiling point of the methanol was controlled by varying nitrogen pressure applied to the condenser and jacket, which permitted precise temperature control to within half a degree centigrade, with the help of electronic control instruments.

Unless otherwise stated, first a small amount (0.01 to 0.10 grams normally) of an oxide compound or the inventive fluorided solid oxide compound was charged under nitrogen to a dry reactor. Next, two milliliters of an organometal compound solution containing 0.5 grams of an organometal compound (usually bis(n-butlycyclopentadienyl)zirconium dichloride) per 100 milliliters of toluene was added by syringe. Then, 1.2 liters of isobutane liquid were charged to a reactor, and the reactor heated up to 90° C. One milliliter or two milliliters to TEA as a 15 weight % (1 molar) solution in heptane or ethyl aluminum dichloride (EADC) as a 25 weight % (1.5 molar) solution in heptane was added midway during the isobutane addition. Finally, ethylene was added to the reactor to equal a fixed pressure, normally 550 psig, which was maintained during the experiment. The stirring was allowed to continue for the specified time, usually around one hour, and the activity was noted by recording the flow of ethylene into the reactor to maintain pressure.

After the allotted time, the ethylene flow was stopped, and the reactor slowly depressurized and opened to recover a granular polymer. In all cases, the reactor was clean with no indication of any wall scale, coating or other forms of fouling. The polymer was then removed and weighed.

Comparative Examples 1 & 2 (No Oxide Compound):

This example demonstrates that an organometal compound solution added to a reactor with an organoaluminum compound but with no oxide compound does not provide any activity. A polymerization run was made as described previously. First, 2 milliliters of bis(n-butylcyclopentadienyl)zirconium dichloride solution (0.5 grams of bis(n-butylcylopentadienyl)zirconium dichloride per 100 ml of toluene) were added. Then, half of the one liter of isobutane was added followed by 2 milliliters of 15% by weight TEA in example 1 or 2 milliliters of 25% ethylaluminum dichloride (EADC) in example 2. The other half of the isobutane was added, and finally, ethylene was added. No activity was observed. After one hour of stirring, the reactor was depressurized and opened, but in each case, no polymer was found. These results are shown in Table 1.

Comparative Example 3 (Silica):

This example demonstrates the use of silica as-an activator for an organometal compound when used with an organoaluminum compound.

Silica was obtained from W. R. Grace, grade 952, having a pore volume of about 1.6 cc/g and a surface area of about 300 square meters per gram. About 10 grams of the silica were placed in a 1.75 inch quartz tube fitted with a sintered quartz disk at the bottom. While the silica was supported on the disk, dry air was blown up through the disk at the linear rate of about 1.6 to 1.8 standard cubic feet per hour. An electric furnace around the quartz tube was then turned on, and the temperature was raised at the rate of 400° C. per hour to a temperature of 600° C. At this temperature, the silica was allowed to fluidize for three hours in the dry air to produce a calcined silica. Afterward, the silica was collected and stored under dry nitrogen. It did not have any exposure to the atmosphere.

The calcined silica was then added to the reactor, followed by an organometal compound solution and TEA solution as described previously. These runs are shown in Table 1, which lists the amount of calcined silica charged, the run time in minutes, and the amount of polymer produced. The calcined silica produced almost no polymer.

Comparative Example 4 (Fluorided Silica)

A 50 gram sample of grade 952 silica described previously was impregnated with 100 milliliters of an aqueous solution containing 5 grams of dissolved ammonium bifluoride to produce a fluorided silica. This gave the sample a wet sand consistency which was then dried under half an atmosphere of vacuum at 110° C. overnight. Then, the fluorided silica was calcined in dry air at 600° C. by the procedures described in Example 3. The fluorided silica had a surface area of about 192 square meters per gram and a pore volume of about 1.29 cc/g.

A small sample of this fluorided silica was then tested as an activator for an organometal compound and an organoaluminum compound in a polymerization experiment. As shown in Table 1, it provided no activity.

Comparative Example 5 (Fluorided Titania)

A 5 gram sample of Aerosil titania was obtained from Degussa, Inc. and calcined in dry air at 600° C. for three hours as described in Example 3. During this calcining, one milliliter of perfluorohexane was injected into a gas stream upstream from the titania bed. As the perfluorohexane vapor rose into the 600° C. bed, it decomposed, thus laying down fluoride onto the surface of the titania. This produced a fluorided titania.

A small sample of this fluorided titania was then tested as an activator for an organometal compound in a polymerization experiment. As shown in Table 1, it provided almost no activity.

Comparative Example 6 (Silica-Titania)

A silica-titania was prepared by cogellation as described in Deitz, U.S. Pat. No. 3,887,494. Titanyl sulfate was dissolved in concentrated sulfuric acid, to which a sodium silicate solution was added slowly with vigorous stirring. When the pH reached about 6, the mixture gelled into a homogenous clear mass. This was then aged at 80° C. at pH 7 for three hours, then washed nine times with water and two times in 1% by weight ammonium nitrate. This gel was then azeotropically dried in ethyl acetate to produce a silica-titania. The silica-titania contained about 8% titanium and had a surface area of about 450 square meters per gram and pore volume of about 2.0 cc/g. A 10 gram sample of the silica-titania was then calcined at 600° C. for three hours in fluidizing dry air. Afterward, a small sample of the silica-titania was tested for polymerization activity with an organometal compound solution. As shown in Table 1, it exhibited no appreciable activity.

Inventive Example 7 (Fluorided Silica-Titania Calcined at 600° C.)

A sample of 8.51 grams of the silica-titania from Example 5 was calcined by fluidizing in dry air at 600° C. for three hours. Then, it was impregnated with 35 milliliters of a solution made by dissolving 2.50 grams of ammonium bifluoride in 100 milliliters of methanol. This brought the silica-titania to incipient wetness and constituted an equivalent of about 3.9 millimoles of fluoride per gram to produce a fluorided silica-titania. The methanol was then evaporated off, and the fluorided silica-titania was again calcined in air at 600° C. for three hours as described above.

Then, 0.1166 grams of the fluorided silica-titania were first charged under nitrogen to a dry reactor. Next, two milliliters of an organometal compound solution containing 0.5 grams of bis(n-butlycyclopentadienyl)zirconium dichloride per 100 milliliters of toluene was added by syringe. Then, 1.2 liters of isobutane liquid was charged, and the reactor brought up to 90° C. One milliliter of 15% TEA was added midway during the isobutane addition. Finally, ethylene was added to the reactor to equal 550 psig pressure which was maintained during the experiment. The stirring was allowed to continue for one hour, and the activity was noted by recording the flow of ethylene into the reactor to maintain pressure.

After the allotted time, the ethylene flow was stopped, and the reactor slowly depressurized and opened to recover a granular polymer. The reactor was clean with no indication of any wall scale, coating or other forms of fouling. The polymer was removed and weighed yielding 137.5 grams. Thus, the activity was found to be 1164 grams of polymer produced per gram of fluorided silica-titania charged per hour. The data are shown in Table 1.

The polymer had a broader molecular weight distribution than polymers produced by typical organometal compounds. It had a melt index of 0.04 g/10 min and a high load melt index of 1.72 g/10 min, giving a shear ratio of 42.5, which is higher than the usual 16-17 ratio obtained from typical organometal compounds. The number average molecular weight was found to be 66,000, and the weight average was 178,000, giving a polydispersity (Mw/Mn) of 2.7. These data are shown in Table 2.

Inventive Examples 8 & 9 (Fluorided Silica-Titania Calcined at 450° C.)

Another sample of the fluorided silica-titania described in Example 7 was calcined at 450° C. instead of 600° C. It too was tested in a polymerization run, and the activity was found to increase to 1834 grams of polymer obtained per gram of fluorided silica-titania charged per hour (Table 1, Example 8).

This fluorided silica-titania that was calcined at 450° C. was tested again, except that it was allowed to react with the TEA and the organometal compound at 90° C. in a reactor for 20 minutes before ethylene was added. This step increased the measured activity to 2837 grams polymer per gram of fluorided silica-titania per hour (Table 1, Example 9).

Comparative Examples 10 & 11 (Silica-Zirconia)

A silica-zirconia was prepared by the following procedure. A silica obtained from W. R. Grace as grade 952 was obtained having a surface area of about 300 square meters per gram and a pore volume of about 1.6 cc/g. A 26.3 gram sample of silica was dried for three hours at 200° C. in fluidizing nitrogen. Afterward, 50 milliliters of a heptane solution containing 11.72 grams of zirconium propoxide were added to the sample. The heptane was then evaporated under nitrogen at 60 degrees C. until the sample was dry to produce a silica-zirconia. It was then calcined in air at 600° C. for three hours. In two tests, the polymerization activity of this silica-zirconia was found to produce 35 and 78 grams of polymer per gram of silica-zirconia per hour.

Inventive Example 12 (Fluorided Silica-Zirconia)

The silica-zirconia used in Examples 10 and 11 was then fluorided by the following procedure. 14.3 grams of the silica-zirconia, which had already been calcined at 600° C., were saturated with an aqueous solution containing 0.82 grams of ammonium bifluoride, which yielded a fluorided silica-zirconia having a wet sand consistency. The fluorided silica-zirconia was dried under vacuum at 120° C. overnight, then calcined in dry air at 500° C. for three hours before being tested for activity. The activity increased to 465 grams of polymer produced per gram of silica-zirconia per hour.

Comparative Example 13 (Silica-Zirconia)

A silica-zirconia containing 10 weight percent zirconium was prepared by anhydrous gellation as detailed by the following procedure. One mole (about 200 mls) of tetraethyl orthosilicate was added to 500 milliliters of n-propanol. One milliliter of sulfuric acid was then added along with 30 milliliters of water, which is about 85% of the amount required for complete hydrolysis. This solution was stirred for thirty minutes to allow for reaction. It warmed slightly, indicating that hydrolysis was taking place. Then, 71 milliliters of zirconium propoxide were added, but no precipitation of zirconia took place, indicating that substantially all of the water had been consumed by reaction with the tetraethyl orthosilicate. The solution was stirred 15 minutes, and the another 50 milliliters of water was added, but again, no zirconia precipitated, indicating that it had become incorporated into the silica. The solution was allowed to stir another 15 minutes, then ammonium hydroxide was added until gellation occurred causing a clear gel to form. The gel was dried in a vacuum oven at 120° C. overnight, then a sample was calcined in dry air at 600° C. for three hours. This sample produced an activity of 230 grams of polymer per gram of silica-zirconia per hour when tested for polymerization activity with an organometal compound and an organoaluminum compound.

Inventive Examples 14 & 15 (Fluorided Silica-Zirconia)

Two samples of the silica-zirconia described in Example 12, one obtained before being calcined at 600° C. (Example 14) and the other obtained afterward (Example 15), were impregnated with a methanol solution containing enough ammonium bifluoride to equal 10% of the weight of the sample. Both samples were dried at 120° C. overnight under vacuum, then calcined at 500° C. for three hours in air. When tested for polymerization activity with an organometal compound and an organoaluminum compound, both yielded a high activity of between 3000 and 5000 grams of polymer per gram of fluorided silica-zirconia per hour.

TABLE 1

Polymerization Results

| Example | Test* Compound | Calcining Temp. (° C.) | Test Compound Charged (g) | Organo-Aluminum Compound (mmol) | Polymer (g) | Run Time (min) | Activity* (g/g/h) |
|---|---|---|---|---|---|---|---|
| 1-Control | No Oxide Compound | | 0.0000 | 2 TEA | 0 | 61.1 | 0 |
| 2-Control | No Oxide Compound | | 0.0000 | 2 EADC | 0 | 28.0 | 0 |
| 3-Control | Silica | 600 | 0.5686 | 2 TEA | 0.7 | 63.0 | 1 |
| 4-Control | Fluorided Silica | 600 | 0.4350 | 1 TEA | 0 | 24.5 | 0 |
| 5-Control | Fluorided Titania | 600 | 0.1461 | 1 TEA | 0.2 | 34.1 | 2 |
| 6-Control | Silica-Titania | 600 | 0.1392 | 2 TEA | 0 | 60.0 | 0 |
| 7-Inventive | Fluorided Silica-Titania | 600 | 0.1166 | 1 TEA | 135.7 | 60.0 | 1164 |
| 8-Inventive | Fluorided Silica-Titania | 450 | 0.0090 | 1 TEA | 17.0 | 61.8 | 1834 |
| 9-Inventive | Fluorided Silica-Titania | 450 | 0.1893 | 1 TEA | 179.0 | 20.0 | 2837 |
| 10-Control | Silica-Zirconia | 600 | 0.1663 | 1 TEA | 13.0 | 60.0 | 78 |
| 11-Control | Silica-Zirconia | 600 | 0.2493 | 1 TEA | 6.0 | 41.5 | 35 |
| 12-Inventive | Fluorided Silica-Zirconia | 500 | 0.2108 | 1 TEA | 98.0 | 60.0 | 465 |
| 13-Control | Silica-Zirconia | 600 | 0.2229 | 1 TEA | 67.8 | 58.0 | 230 |
| 14-Inventive | Fluorided Silica-Zirconia | 500 | 0.0277 | 1 TEA | 98.0 | 70.0 | 3033 |
| 15-Inventive | Fluorided Silica-Zirconia | 500 | 0.1129 | 1 TEA | 257.0 | 30.9 | 4420 |

Polymerization at 90° C., 550 psig, and 1.2 liters of isobutane;
Organometal Compound = 25 micromoles bis(n-butyl cyclopentadienyl) zirconium dichloride, or 2.3 mg Zr
Organoaluminum Compound = 1 or 2 mls of TEA or 2 mls of EADC

TABLE 2

| Test Compound | HLMI (g/10 min) | HLMI/MI | Number Avg. Mol. Wt. (Mn) | Weight Avg. Mol. Wt. (Mn) | Mw/Mn |
|---|---|---|---|---|---|
| Fluorided Silica-titania | 1.72 | 42.5 | 66,000 | 178,000 | 2.7 |

While this invention has been described in detail for the purpose of illustration, it is not intended to be limited thereby but is intended to cover all changes and modifications within the spirit and scope thereof.

That which is claimed is:

1. A catalyst composition comprising:
a contact product of at least one organometal compound, at least one organoaluminum compound, and at least one fluorided solid oxide compound, the catalyst composition having catalytic activity in the substantial absence of organoborates and aluminoxanes,
wherein: the organometal compound has the following general formula:

$(X^1)(X^2)(X^3)(X^4)M^1$ wherein:
$M^1$ is selected from titanium, zirconium, or hafnium;
$(X^1$, is independently selected from cyclopentadienyls, indenyls, fluorenyls, substituted cyclopentadienyls, substituted indenyls, or substituted fluorenyls; the substituents on the substituted cyclopentadienyls, substituted indenyls, and substituted fluorenyls of $(X^1)$ are selected from aliphatic groups, cyclic groups, combinations of aliphatic and cyclic groups, silyl groups, alkyl halide groups, halides, organometallic groups, phosphorus groups, nitrogen groups, silicon, phosphorus, boron, or germanium;
at least one substituent on $(X^1)$ can be a bridging group which connects $(X^1)$ and $(X^2)$;
$(X^3)$ and $(X^4)$ are independently selected from halides, aliphatic groups, substituted aliphatic groups, cyclic groups, substituted cyclic groups, combinations of aliphatic groups and cyclic groups, combinations of substituted aliphatic groups and cyclic groups, combinations of aliphatic groups and substituted cyclic groups, combinations of substituted aliphatic groups and substituted cyclic groups, amido groups, substituted amido groups, phosphido groups, substituted phosphido groups, alkyloxide groups, substituted alkyloxide groups, aryloxide groups, substituted aryloxide groups, organometallic groups, or substituted organometallic groups;
$(X^2)$ is selected from cyclopentadienyls, indenyls, fluorenyls, substituted cyclopentadienyls, substituted indenyls, substituted fluorenyls, halides, aliphatic groups, substituted aliphatic groups, cyclic groups, substituted cyclic groups, combinations of aliphatic groups and cyclic groups, combinations of substituted aliphatic groups and cyclic groups, combinations of aliphatic groups and substituted cyclic groups, combinations of substituted aliphatic groups and substituted cyclic groups, amido groups, substituted amido groups, phosphido groups, substituted phosphido groups, alkyloxide groups, substituted alkyloxide groups, aryloxide groups, substituted aryloxide groups, organometallic groups, or substituted organometallic groups;
the substituents on $(X^2)$ are selected from aliphatic groups, cyclic groups, combinations of aliphatic groups and cyclic groups, silyl groups, alkyl halide groups, halides, organometallic groups, phosphorus groups, nitrogen groups, silicon, phosphorus, boron, or germanium;
at least one substituent on $(X^2)$ can be a bridging group which connects $(X^1)$ and $(X^2)$;
the organoaluminum compound has the following general formula:

$Al(X^5)_n(X^6)_{3-n}$ wherein:
$(X^5)$ is a hydrocarbyl having from 1 to about 20 carbon atoms;
$(X^6)$ is a halide, hydride, or alkoxide; and
"n" is a number from 1 to 3 inclusive; and the fluorided solid oxide compound comprises fluoride and a solid oxide compound; and
the solid oxide compound is selected from silica-titania or silica-zircoma.

2. The catalyst composition as claimed in claim 1, wherein the catalyst composition has an activity greater than 1000 grams of polymer per gram of fluorided solid oxide compound per hour under slurry polymerization conditions, using isobutane as a diluent, with a polymerization temperature of 90° C., and a pressure of 550 psig.

3. The catalyst composition as claimed in claim 1, wherein the catalyst composition has an activity greater than 2500 grams of polymer per gram of fluorided solid oxide compound per hour under sluny polymerization conditions, using isobutane as a diluent, with a polymerization temperature of 90° C., and a pressure of 550 psig.

4. The catalyst composition as claimed in claim 1, wherein the weight ratio of the organoaluminum compound to the treated fluorided oxide compound in the catalyst composition ranges from about 3:1 to about 1:100.

5. The catalyst composition as claimed in claim 1, wherein the weight ratio of the organoaluminum compound to the fluorided solid oxide compound in the catalyst composition ranges from 1:1 to 1:50.

6. The catalyst composition as claimed in claim 1, wherein the weight ratio of the fluorided solid oxide compound to the organometal compound in the catalyst composition ranges from about 1000:1 to about 10:1.

7. The catalyst composition as claimed in claim 1, wherein the weight ratio of the treated solid oxide compound to the organometal compound in the catalyst composition ranges from 250:1 to 20:1.

8. The catalyst composition as claimed in claim 1, wherein the organometal compound is selected from bis(cyclopentadienyl)hafnium dichloride, bis(cyclopentadienyl)zirconium dichloride, 1,2-ethanediylbis($\eta^5$-1-indenyl) di-n-butoxyhafnium, 1,2-ethanediylbis($\eta^5$-1-indenyl) dimethylzirconium, 3,3-pentanediylbis($\eta^5$-4,5,6,7-tetrahydro-1-indenyl)hafnium dichloride, methylphenylsilylbis($\eta^5$-4,5,6,7-tetrahydro-1-indenyl)zirconium dichloride, bis(n-butylcyclopentadienyl)di-t-butylamido hafnium, bis(n-butylcyclopentadienyl) zirconium dichloride; dimethylsilylbis(1-indenyl) zirconium dichloride, nonyl(phenyl)silylbis(1-indenyl) hafnium dichloride, dimethylsilylbis($\eta^5$-4,5,6,7-tetrahydro-1-indenyl)zirconium dichloride, dimethylsilylbis(2-methyl-1-indenyl)zirconium dichloride, 1,2-ethanediylbis(9-fluorenyl)zirconium dichloride, indenyl diethoxy titanium(IV) chloride, (isopropylamidodimethylsilyl)cyclopentadienyltitanium dichloride, bis(pentamethylcyclopentadienyl)zirconium dichloride, bis(indenyl)zirconium dichloride, methyloctylsilyl bis (9-fluorenyl) zirconium dichloride, or bis-[1-(N,N-diisopropylamino)boratabenzene]hydridozirconium trifluoromethylsulfonate.

9. The catalyst composition as claimed in claim 1, wherein the organometal compound is selected from bis(n-butylcyclopentadienyl)zirconium dichloride, bis(indenyl) zirconium dichloride, dimethylsilybis(1-indenyl) zirconium dichloride, or methyloctylsilyl bis(9-fluorenyl) zirconium dichloride.

10. The catalyst composition as claimed in claim 1, wherein the organoaluminum compound is selected from trimethylaluminum, triethylaluminum, tripropylaluminum, diethylaluminum ethoxide, tributylaluminum, diisobutylaluminum dydride, triisobutylaluminum hydride, triisobutylaluminum, or diethylaluminum chloride.

11. The catalyst composition as claimed in claim 1, wherein the organoaluminum compound is triethylaluminum.

12. A catalyst composition comprising at least one post-contacted organometal compound, at least one post-contacted organoaluminum compound, and at least one fluorided solid oxide compound, the at least one fluorided solid oxide compound which comprises fluoride and a solid oxide compound prior to contacting with the at least one post-contacted organometal compound and the at least one post-contacted organoaluminum compound; the solid oxide compound being selected from silica-titania or silica-zirconia; and wherein the catalyst composition is substantially free of organoborates and aluminoxanes.

13. The catalyst composition as claimed in claim 12, wherein the organometal compound, prior to contacting, has the following general formula:

$(X^1)(X^2)(X^3)(X^4)M^1$ wherein:
  $M^1$ is selected from titanium, zirconium, or hafnium;
  $(X^1)$ is independently selected from cyclopentadienyls, indenyls, fluorenyls, substituted cyclopentadienyls, substituted indenyls, or substituted fluorenyls;
  the substitutents on the substituted cyclopentadienyls, substituted indenyls, and substituted fluorenyls of $(X^1)$ are selected from aliphatic groups, cyclic groups, combinations of aliphatic and cyclic groups, silyl groups, alkyl halide groups, halides, organometallic groups, phosphorus groups, nitrogen groups, silicon, phosphorus, boron, or germanium;
  at least one substituent on $(X^1)$ can be a bridging group which connects $(X^1)$ and $(X^2)$;
  $(X^3)$ and $(X^4)$ are independently selected from halides, aliphatic groups, substituted aliphatic groups, cyclic groups, substituted cyclic groups, combinations of aliphatic groups and cyclic groups, combinations of substituted aliphatic groups and cyclic groups, combinations of aliphatic groups and substituted cyclic groups, combinations of substituted aliphatic groups and substituted cyclic groups, amido groups, substituted amido groups, phosphido groups, substituted phosphido groups, alkyloxide groups, substituted alkyloxide groups, aryloxide groups, substituted aryloxide groups, organometallic groups, or substituted organometallic groups;
  $(X^2)$ is selected from cyclopentadienyls, indenyls, fluorenyls, substituted cyclopentadienyls, substituted indenyls, substituted fluorenyls, halides, aliphatic groups, substituted aliphatic groups, cyclic groups, substituted cyclic groups, combinations of aliphatic groups and cyclic groups, combinations of substituted aliphatic groups and cyclic groups, combinations of aliphatic groups and substituted cyclic groups, combinations of substituted aliphatic groups and substituted cyclic groups, amido groups, substituted amido groups, phosphido groups, substituted phosphido groups, alkyloxide groups, substituted alkyloxide groups, aryloxide groups, substituted aryloxide groups, organometallic groups, or substituted organometallic groups;
  the substituents on $(X^2)$ are selected from aliphatic groups, cyclic groups, combinations of aliphatic groups and cyclic groups, silyl groups, alkyl halide groups, halides, organometallic groups, phosphorus groups, nitrogen groups, silicon, phosphorus, boron, or germanium;
  at least one substituent on $(X^2)$ can be a bridging group which connects $(X^1)$ and $(X^2)$.

14. The catalyst composition as claimed in claim 12, wherein the organoaluminum compound, prior to contacting, has the following general formula:

$Al(X^5)_n(X^6)_{3-n}$ wherein:
  $(X^5)$ is a hydrocarbyl having from 1 to about 20 carbon atoms;
  $(X^6)$ is a halide, hydride, or alkoxide; and
  "n" is a number from 1 to 3 inclusive.

* * * * *